United States Patent [19]
Taft

[11] 3,996,956
[45] Dec. 14, 1976

[54] ELECTRO-FLUID INTERFACE DEVICE

[75] Inventor: Charles K. Taft, Durham, N.H.

[73] Assignee: University of New Hampshire, Durham, N.H.

[22] Filed: Nov. 10, 1975

[21] Appl. No.: 630,369

[52] U.S. Cl. .......................... 137/119; 137/624.14; 235/201 ME
[51] Int. Cl.² ...................................... G05D 11/00
[58] Field of Search .................. 137/625.64, 624.14, 137/831, 119; 235/201 ME

[56] References Cited
UNITED STATES PATENTS

| 3,431,934 | 3/1969 | Riordan | 137/624.14 X |
| 3,504,692 | 4/1970 | Goldstein | 137/624.14 X |
| 3,552,437 | 1/1971 | Blosser | 235/201 |

Primary Examiner—Alan Cohan
Attorney, Agent, or Firm—Kenway & Jenney

[57] ABSTRACT

An electro-fluid interface device utilizes a control member that oscillates within a generally cylindrical chamber between an opposed pair of nozzles located at the ends of the chamber. Each nozzle is in fluid communication with a fluid supply, a fluid outlet, and a fluid drain. A coil or coils energized in response to an electrical input signal pulse width modulate the oscillation of the control member to produce a fluid flow through the outlets that is proportional to the electrical signal. In a preferred form, a pair of the coils is energized to oscillate the control element electromagnetically in cooperation with fluid flow forces on the control member due to the flow through the nozzles. Means for sensing the position of the control element switch the energizing current between the coils.

15 Claims, 8 Drawing Figures

ELECTRO-FLUID INTERFACE DEVICE

BACKGROUND OF THE INVENTION

This invention relates in general to electro-fluid interface devices and more particularly to electro-fluid servo valves that convert and electrical signal into an output pressure or fluid flow proportional to that signal.

In many applications, such as the control of hydraulic actuators by electronic control circuits, it is necessary to convert an electrical signal to a proportional fluid flow or pressure output. A well-known device for effecting this conversion is a proportional servo valve that employs a very high bandwidth torque motor to convert the electrical signal to the mechanical motion of the torque motor armature. The mechanical motion of the armature can drive a standard spool valve directly, or more typically, it operates against a pair of nozzles to create a pressure differential in the nozzles.

Frequently, the forces on the spool valve are sufficiently high that it is necessary to operate the valve in two stages. In the first stage the torque motor armature operating against nozzles produces a difference in pressure upstream of the nozzles. This pressure difference is then used to position a second stage spool valve. U.S. Pat. No. 2,625,136 to Moog discloses a representative valve of this type. A major disadvantage of these valves is that the torque motor parts must be machined to very close material and dimensional tolerances which significantly increases the cost of manufacture. Other problems include a susceptibility to contamination build up and difficulty in following small signal changes, especially near the zero output point, due to friction and hysteresis effects.

U.S. Pat. No. 3,552,437 to Blosser discloses an interface device which controls a fluid flow by electromagnetically positioning a ball or valve member to open or close a selected inlet port. Although this device avoids the problems of a Moog type of valve, it has a fundamental shortcoming in that it is strictly an "on-off" device and therefore cannot produce a fluid flow or pressure change proportional to an electrical input.

U.S. Pat. No. 3,431,934 to Riordan describes a proportional flow device that employs an oscillating valve element to control the fluid flow. A pair of plenum chambers develop a driving pressure for the oscillation. The valve element alternately seats on an outlet from one of the plenum chambers until the fluid pressure in the chamber builds up to a level sufficient to overcome the seating forces. Coils convert an electrical signal into an electromagnetic force on the valve element to influence the average position of the oscillating valve member and thereby establish corresponding changes in the output flow or pressure.

One difficulty with the Riordan device is that the dwell time when the valve element is seated significantly limits the oscillation frequency. Since this frequency must exceed the band pass of the fluid system in which the device is connected, the usefulness of the device is significantly limited, particularly for hydraulic control applications. Another problem is the wear or deterioration of the seat due to the constant slamming of the valve element against the seat.

Another disadvantage is that the Riordan device is designed for use principally with compressible fluids that will rapidly develop a pressure build up in the plenum chambers when the valve element is seated. This dependence on fluid compressibility makes the valve operation sensitive to changes in the temperature and condition of the fluid which significantly increases the difficulty of maintaining a steady state oscillation at a preselected frequency and amplitude. To operate with relatively incompressible fluids, Riordan provides bellows within the plenum chambers. These bellows, however, greatly reduce the frequency of oscillation of the element.

It is therefore a principal object of the invention to provide a proportional electro-fluid interface device that is rugged, highly reliable, and operates effectively in a wide range of fluid systems while having a low cost of manufacture.

A further object of this invention is to provide a proportional electro-fluid device that minimizes contamination build up, has excellent wear characteristics, a good sensitivity near zero output, and a fast response time.

Yet another object of the invention is to provide an electro-fluid interface device that can be accurately, reliably and conveniently tuned to and maintain a desired frequency and amplitude of oscillation.

SUMMARY OF THE INVENTION

An electro-fluid interface device utilizes flow forces through the device and electromagnetic forces generated by coils surrounding the device to oscillate a ferromagnetic control member and pulse width modulate the oscillation in response to an electrical control signal. The control member oscillates linearly within a generally cylindrical chamber at a frequency in excess of the band pass of the fluid system in which the valve is connected. An opposed pair of nozzles located at opposite ends of the chamber direct the fluid flow through the device and interact with the control member to develop a back pressure in each nozzle that is a function of the average position of the control member. A fluid inlet and a drain are in fluid communication through each nozzle. A fluid outlet is in direct fluid communication with the interior of each nozzle. In one form, the fluid forces through the nozzle and the chamber establish a steady state oscillation of the member. In another form, the coils act in cooperation with the fluid flow forces to generate the oscillation. Coil driven oscillation preferably utilizes a pair of coils, one associated with each nozzle, alternately energized to peak power in response to the position of the control member within the chamber and the applied electrical control signal. Preferably limit stops are provided within the chamber to ensure that the control member does not seat on the nozzles.

These and other objects and features of the invention will be more easily understood from the following detailed description to be read in light of the accompanying drawings.

DETAILED DESCRIPTION OF THE PREFERRED EMBODIMENTS

Figure 1:
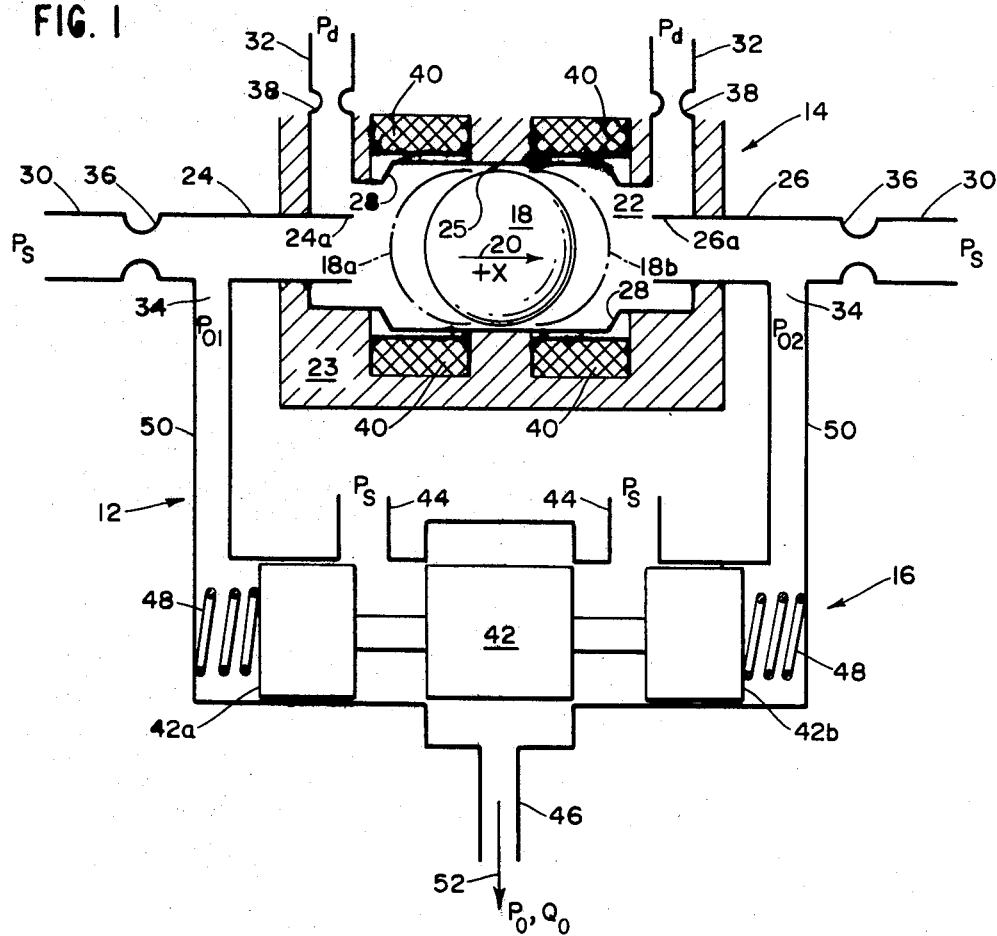
FIG. 1 is a simplified schematic view of a two-stage servo valve that incorporates an electro-fluid interface device constructed according to this invention as the first stage.

FIG. 1 shows a two-stage servo valve indicated generally at 12 that employs an electro-fluid interface device 14 constructed according to the invention as a first stage that positions a standard three-way spool valve 16 functioning as a second stage. The interface device 14 has a control member or ball 18 which is free to move linearly in the X direction (indicated by the arrow 20) within a generally cylindrical chamber 22 formed in a housing 23. A clearance 25 between the ball 18 and the surrounding walls of the chamber 22 is desirable to minimize the costs of machining the chamber 22 and the ball 18 and reduce the sensitivity of the device 14 to contamination.

An opposed pair of nozzles 24 and 26 located at opposite ends of the chamber 22, each in alignment with the ball 18 along the X direction, direct fluid flow forces through the device 14 to establish a limit cycle or a steady state oscillation of the ball between the limit positions 18a and 18b (in phantom). These limit positions define the maximum amplitude of the oscillation. Stops 28 make contact with the ball 18 in limit positions 18a and 18b before the ball comes to rest on the nozzle ends 24a and 26a that are in direct fluid communication with the chamber 22.

The fluid forces through the nozzles 24 and 26 are generated by a fluid flow from a pair of inlets 30 to a pair of drains 32 and a pair of outlets 34. The fluid inlets 30 are connected to a pressure source at a substantially constant supply pressure $P_s$. The other "exterior" ends 24b and 26b of the nozzles 24 and 26, respectively, are each connected to an inlet 30 through a flow restrictor 36. Each fluid outlet 34 is in direct fluid communication with the interior of one of the nozzles 24 or 26. The outlets 34 are located on the opposite side of the restrictors 36 from the inlets 30. In the illustrated embodiment, the fluid drains 32 are in direct fluid communication with the chamber 22 and positioned proximate the interior ends 24a and 26a of each of the nozzles 24 and 26. Each fluid drain also has a flow restrictor 38.

In general, the supply pressure at the inlet 30 is greater than the output pressure at the outlet 34, which is greater than the drain pressure, typically at atmosphere. Each nozzle 24 and 26 therefore directs a fluid flow from the inlet to an associated outlet 34 and drain 38 (a small portion of the flow passing around the ball to the opposite drain 34). These fluid flow forces establish a steady state oscillation of the ball 18 between the limit positions 18a and 18b. In the limit position 18a the momentum of the fluid forces on the ball from the nozzle 24 predominate and tend to drive the ball to the right. As the ball nears the limit position 18b, the fluid forces from the nozzle 24 diminish and those from the nozzle 26 predominate. The momentum of the ball carries it to the limit position 18b (determined by the stops 28), where the ball comes to rest momentarily until the fluid forces from the nozzle 26 drive it back towards the limit position 18a. It should be noted that for a given fluid system, the establishment of a steady state oscillation, as well as its frequency, depends on interrelated factors such as the mass and diameter of the ball 18, the diameter and volume of the nozzles, the spacing between the ball and the nozzle at a limit position, and characteristics of the fluid such as its compressibility and viscosity.

The ball 18 also interacts with these fluid flow forces to develop a back pressure in the nozzles 24 and 26, and therefore the outlets 34, that is a function of the ball position. When the ball is in the limit position 18a, for example, a fluid flow exiting nozzle 24 is presented with a flow path that is restricted by the relatively narrow annular clearance between the nozzle and the ball. This tends to raise the pressure in the nozzle 24. However, because of the oscillation described above, a similar pressure is generated in the nozzle 26 when the ball is in the limit position 18b. Provided the nozzles 24 and 26 have the same dimensions, and the inlet pressures and other flow directing elements are substantially the same, the ball will oscillate at a steady rate and have essentially the same effect on the outlet pressures $P_{01}$ and $P_{02}$ at each outlet 34.

Figure 2A:
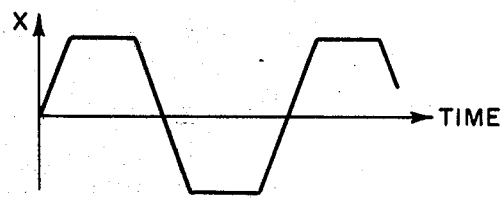
FIG. 2a is a graph showing a position of the control member as a function of time in the absence of an applied electrical signal.
Figure 2B:
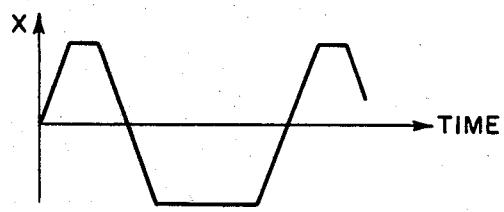
FIG. 2b is a graph corresponding to FIG. 2a showing the pulse width modulation of the oscillation of the control member with an applied electrical signal.

A pair of coils 40, each located near one of the nozzles, surround the chamber 22. The axes of the coils are aligned along the X direction so that electrical current in the coils establish a magnetic force field also aligned in the X direction. The coils 40 are energized by currents carrying an electrical control signal. The electrical signal is preferably carried as a difference in the currents flowing in the two coils 40, with the current being supplied by a standard push-pull DC power amplifier or a power transistor operating as a current amplifier. Since the ball 18 is formed from a ferromagnetic material, the electromagnetic forces generated by this current difference flowing through coils 40 cause the ball 18 to spend a longer period of time near the nozzle associated with the coil carrying the larger current than the nozzle associated with the coil carrying the smaller current. This situation is represented graphically in FIGS. 2a and 2b which show the ball displacement as a function of time. FIG. 2a illustrates a steady state oscillation with no net electromagnetic forces applied. FIG. 2b illustrates a pulse width modulation where the ball 18 is electromagnetically influenced to spend a longer period of time near the nozzle 24 (the negative X direction as shown) than the nozzle 26 (the positive X direction as shown). With this modulation the net average flow restriction presented to the fluid flow through the nozzle 24 is greater than that presented to the fluid flow through the nozzle 26. As a result the fluid pressure $P_{01}$ at the outlet 34 associated with the nozzle 24 is greater than the output pressure $P_{02}$ at the conduit 34 associated with the nozzle 26. Moreover, the difference in the pressure $P_{01}$ and $P_{02}$ is proportional to the electrical control signal applied to the coils 32, thereby establishing the desired electrical to fluid conversion. It should be noted that although the conversion is proportional, it is not necessarily linear.

In the two-stage valve 12 shown in FIG. 1, the device 14 converts the electrical control signal into a differential between the pressures in the outlets 34 which is used to position the three-way spool valve 16 having a spool 42 that controls the fluid flow from a pair of inlets 44 (at the supply pressure $P_s$) to an outlet 46. A pair of springs 48 center the spool to block flow from the inlets 44 to the outlet 46. However, since the outlets 34 are connected by the conduits 40 to the regions adjacent the end surface 42a and 42b of the spool, any pressure differential between the outlets 34, generated by an electrical control signal applied to the coils 40, shifts the position of the spool valve to allow a fluid flow, indicated by the arrow 52, from one of the inlets 44 to the outlet 46. In the system shown in FIG. 1, the mass of the spool 44 and the compressibility of the fluid in the outlets 34, the conduits 52, and the regions adjacent the surfaces 42a and 42b filter the ball oscillation, that is, prevent the spool 44 from following exactly the movements of the ball 18. More generally, for the device 14 to operate effectively in a fluid system, the frequency of oscillation of the ball 18 should be much higher than the band pass of the fluid system. For a pneumatic system, the frequency of oscillation of the ball 18 should typically be in excess of 100 hz. For hydraulic systems, the frequency should typically be in excess of 1,000 hz.

Figure 3:
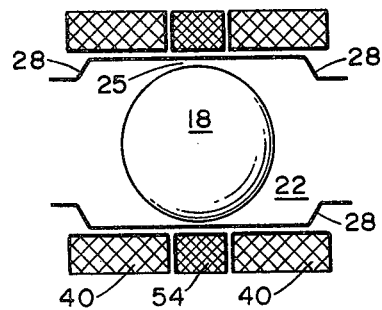
FIG. 3 is a view corresponding to FIG. 1 illustrating an alternative embodiment of the interface device constructed according to the invention which includes a feedback coil to sense the position of the control member.

FIG. 3 illustrates an alternative embodiment of the invention in which the coils 40 act as drive coils to oscillate the ball electromagnetically, in cooperation with the fluid flow forces, rather than principally with fluid forces as described hereinabove. The currents energizing the coils 40 are switched in a generally alternating mode. The switching and the amplitude of the current as a function of time are selected to establish a magnetic field that propels the ball 18 between preselected limit positions at a preselected frequency. It should be noted that during at least portions of the ball oscillation cycle, the net electromagnetic force on the ball may oppose the net fluid forces and/or the momentum of the ball. In general, the switching occurs just after the ball passes the midpoint of its free travel path.

Figure 2C:
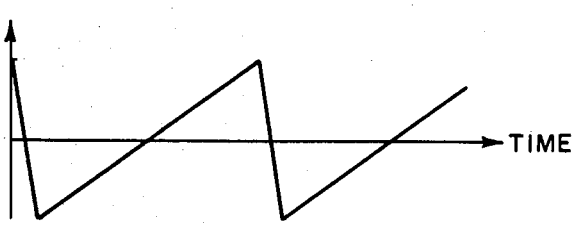
FIG. 2c is a graph corresponding to FIG. 2b showing the current in one of the coils as a function of time.

FIG. 2c graphically illustrates the current in one of the drive coils 40 as a function of time. Such a current waveform can be generated by a transistorized amplifier acting nearly as a current source. A comparison of FIG. 2c and FIG. 2b demonstrates the effect of this current waveform on the ball position. The current waveform could be a perfect sawtooth pattern, but this would require an unacceptably high input driving voltage at the end of the sawtooth to accommodate for the inductances of the coils. A similar current waveform is associated with the other coil 40.

A feedback coil 54 located between the coils 40, near the midpoint of the free travel path of the ball between the nozzles 24 and 26, controls the switching of current between the coils 40. The feedback coil 54 senses the position of the ball through changes in the magnetic flux linkages induced by the presence of the ferromagnetic material forming the ball. The flux linkage is at a maximum when the ball is centered between the driving coil and the feedback coil (providing other factors, such as the rate of change of the driving coil currents, are constant). This position is reflected by a sharp voltage pulse induced in the feedback coil which is processed electronically by well-known techniques to trigger the current switching. The electrical control signal pulse width modulates the oscillation by biasing the currents applied to the drive coils 40 or by introducing an appropriate delay in the feedback signal. This electronic control over the ball oscillation allows the oscillation to be tuned to a desired frequency and amplitude with a high degree of accuracy, particularly in comparison to the situation where the ball oscillation is established principally by fluid flow forces. The use of a position sensing feedback to control the oscillation also has the advantage of making the operation of the device 14 less sensitive to changes in the fluid and the fluid flow forces.

Figure 4:
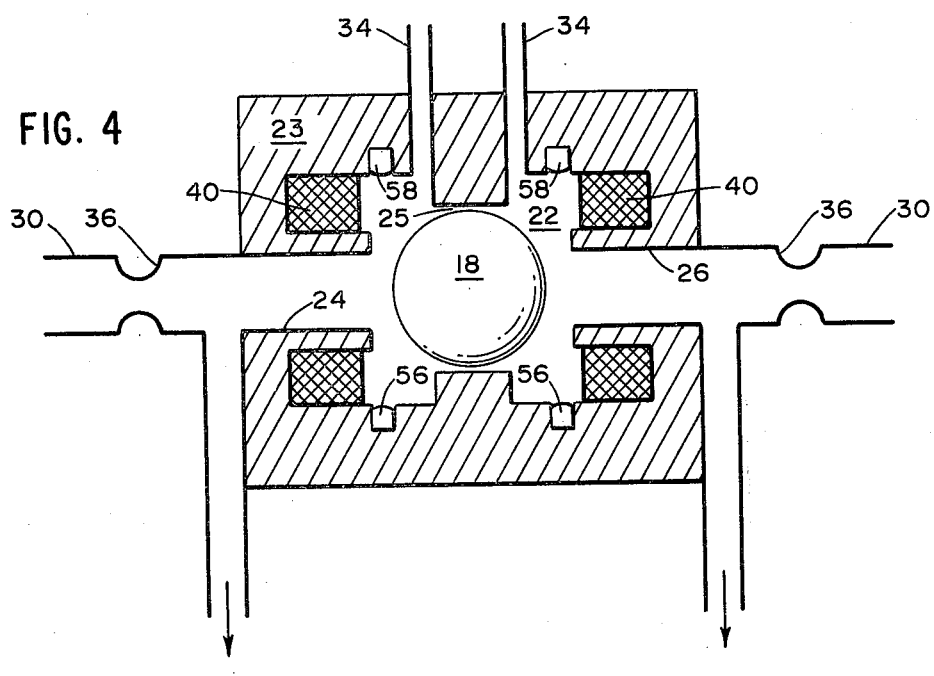
FIG. 4 is a simplified schematic view of an alternative embodiment of the invention.

FIG. 4 illustrates an alternative embodiment of the invention in which the coils 40 are positioned to achieve a greater magnetic force on the ball and the position of the ball is sensed by light emitting diodes 56 and photodiode detectors 58. As the ball 18 reaches a limit position near either nozzle 24 or 26, it interrupts the light from one of the diodes 56 falling on a photodiode detector 58. This generates a signal that switches the current in the drive coils 40. Although the photodiodes and the feedback coil 54 both offer the advantages of an electronically tuned oscillation, the diode arrangement is preferred since it provides a more positive indication of the ball position than the feedback coil.

Figure 6:
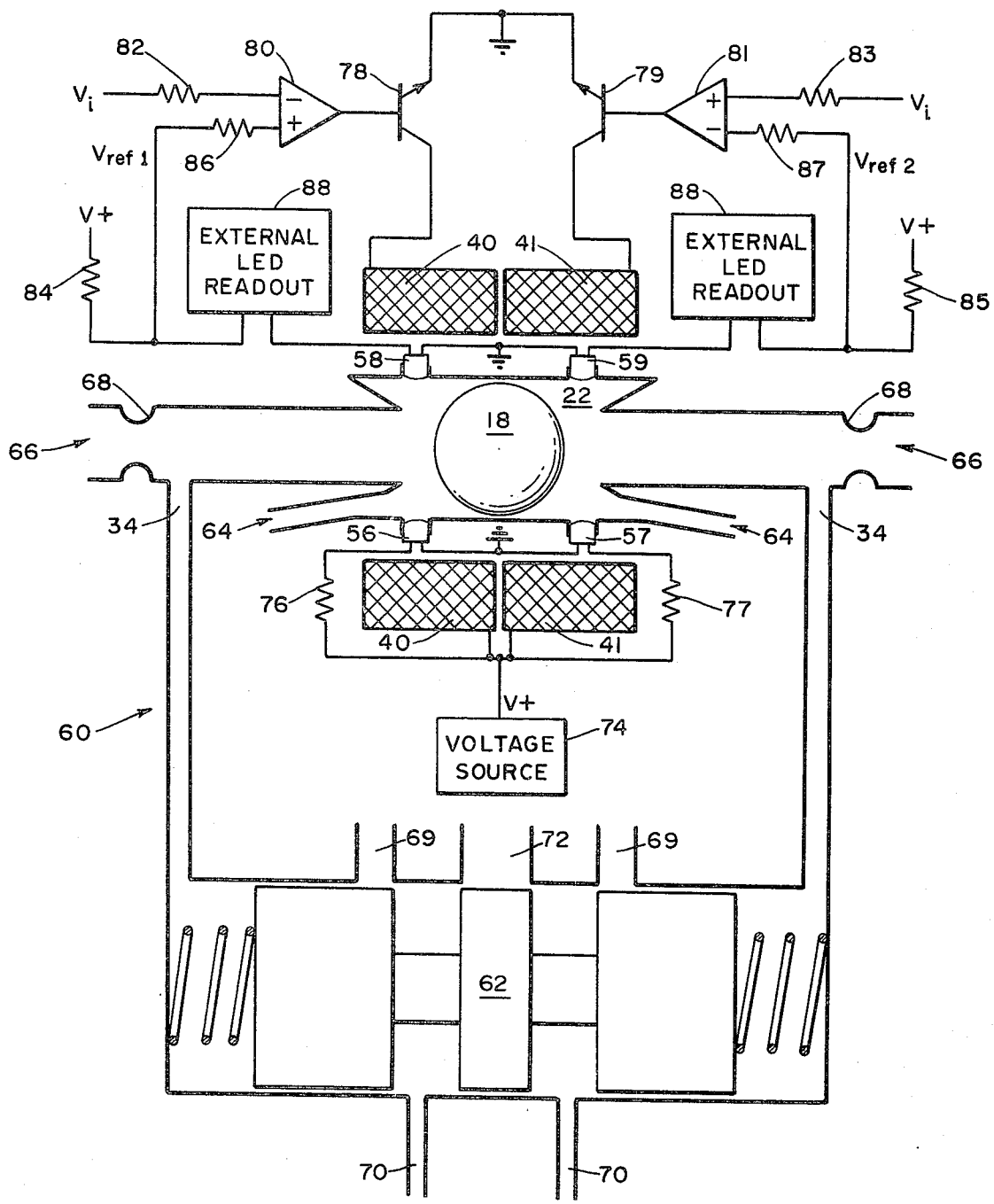
FIG. 6 is a simplified schematic view of a two-stage servo valve utilizing an alternative embodiment of an electrofluid interface device constructed according to the invention and the associated circuitry for electromagnetically driving the control member in a predetermined manner.

FIG. 6 shows another embodiment in the invention incorporated in a two stage servo valve 60. The interface device 14 shown in FIG. 6 is the first stage of the valve with the fluid output at the outlets 34 applied to position a spool valve 62 in the second stage. In this embodiment of the device 14, fluid inlets 64 are in direct communication with the interior of the chamber 22, and fluid drains 66 communicate with the exterior ends of the nozzles 24 and 26 through flow restrictors 68.

The spool valve 62 controls a fluid flow from a pair of inlets 69 to a pair of fluid outlets 70, each associated with one of the inlets 68. When the spool valve 62 is displaced from its centered position, in response to a pressure differential between the outlet 34, the fluid flow from one of the inlets 69 is directed primarily to its associated outlet 70. The fluid flow from the other inlet 68 has a reduced flow to its associated outlet 70 since the flow restriction to a common drain 72 is reduced.

FIG. 6 also illustrates suitable electronic circuitry for electromagnetically oscillating the ball with pulse width modulation proportional to the electrical control signal represented by a voltage $V_i$. The light emitting diodes 56 and 57 are powered through the resistors 76 and 77, respectively by a DC voltage source 74 at a potential +V. The diode and resistor combinations are connected in parallel with a common ground. The voltage source 74 also powers the coils 40 and 41 by way of power transistors 78 and 79, where transistors 78 and 79 are each connected between one of the coils and a common ground so that their respective collector-emitter currents control the current flow in the respective coil. A pair of operational amplifiers 80 and 81, each of which has its output connected to the base of one of the transistors 78 and 79, in turn control the collector-emitter current through the transistors 78 and 79. The operational amplifiers 80 and 81 are operated in the differential mode with the input control signal $V_i$ applied through resistor 82 to the negative input of the amplifier 80 and through the resistor 83 to the positive input of the other amplifier. Reference voltages $V_{ref\ 1}$ and $V_{ref\,2}$ are established by resistor 84 and photodiode 58 and resistor 85 and photodiode 59, respectively. $V_{ref\,1}$ and $V_{ref\,2}$ are applied to the positive and negative input terminals, respectively, of amplifiers 80 and 81 by way of resistors 86 and 87.

The photodiodes 58 and 59 operate essentially as on-off devices and are connected between ground and the junction of the resistors 84 and 85, respectively at the potential V. As a result $V_{ref\,1}$ and $V_{ref\,2}$ are either equal to 0 or +V volts (approximately), depending on whether the respective photodiode is in its conductive or nonconductive state. This arrangement generates the desired current switching in response to the ball position. In operation, when the ball is at or near the left limit position it interrupts the light from the light emitting diode 56 falling on the associated photodiode 58 causing that diode to block any current flow. This creates an open circuit condition in the ground connection, thereby applying +V through the resistor 84 and resistor 86 to the positive input of amplifier 80. At the same time, diode 59 is maintained in its conductive state so that 0 volts are applied to the negative input of amplifier 81. In response, amplifier 80 applies a voltage $V-V_i$ to the base of transistor 78. At the same time, amplifier 81 applies a voltage $0 + V_i$ to the base of transistor 79. By the appropriate selection of a value for $V_i$, the voltages applied to the bases of transistors 78 and 79 control the states of those transistors. For example, where $V_i$ is near zero volts, transistor 78 is maintained in its conductive state (thereby energizing coil 40) and transistor 79 is in its nonconductive state (permitting virtually zero current in coil 41). Of course, with coil 40 energized and coil 41 not, magnetic forces are generated to drive the ball from the left limit 18a toward the right limit 18b.

When the ball is at or near the right limit position, the circuit conditions just described are reversed and the ball is driven from the right limit toward the left limit. If the ball is centrally located depending on the geometry, there may also be an unstable equilibrium point where the ball may be positioned so that both photodiodes 58 and 59 are in their conductive state. However, a perturbation from this state would drive the ball into oscillatory motion in accordance with the above description.

With the ball at the left limit and where $V_i$ is equal to V transistor 78 is maintained in its nonconductive state and transistor 79 is in its conductive state, with a corresponding reversal of the magnetic forces on the ball. Similarly, with the ball at the right limit, the forces on the ball are related to $V_i$ in a similar manner. Thus, the particular value for $V_i$ controls the forces on the ball. By suitably adjusting the value of $V_i$ a bias may be established so that at one limit the ball may be subjected to greater return forces than at the other limit. In response the ball motion is skewed from a symetrical oscillation. By varying $V_i$, this bias may be varied so that the ball motion may be pulse width modulated.

An advantage of the position sensing feedback mode of operating the device 14 described in connection with FIGS. 3, 4 and 6 is that the alternating feedback signal generated by the feedback coil 54 or the photodiodes 58 or 59 can also be used to energize an external visual readout device such as light emitting diode (LED) readout devices 88 (FIG. 6). Each "external" LED 88 is connected in series with one of the "internal" diodes 58 or 59 to provide a direct visual indication of satisfactory operation. If both LED's 88 appear to the eye to be "on" or lighted, then the device 14 is operating satisfactorily; if one or both of the LED's 88 are "off" or not lighted, then the device is not operating satisfactorily.

It will be understood that the selection of values for parameters of the interface device 14 such as the ball mass and diameter, the nozzle dimensions and the ball-nozzle spacing will depend on the nature of the fluid, the fluid system, and the desired operational characteristics of the interface device. However, certain design considerations are generally applicable. For example, the mass of the ball must be small to minimize the momentum of the ball and therefore make it easier to oscillate, whether by fluid forces, or a combination of electromagnetic and fluid forces. On the other hand, the ball must be large enough to restrict the fluid flow through the nozzles. Also, as the ball dimensions increase, the problems of contamination build up become less significant. Other related considerations include the ease of fabricating parts of different sizes and the fluid flow requirements of the fluid system. By way of illustration, but not of limitation, the diameter of the ball can be 0.10 inches or less, with a nozzle diameter of 0.050 inch or less.

Another significant design consideration is the distance between the nozzles on the ball. The ball exerts an effective, nearly linear control over the nozzle flow only when it is relatively closely spaced from the nozzle, typically less than ⅛ of the nozzle diameter. Although some linearization occurs due to the push-pull effect of the two opposed nozzles, it is advisable to ensure that the maximum separation between the ball and a given nozzle (when the ball is closest to the opposite nozzle) is less than ¼ of the nozzle diameter. For a ball with a 0.10 inch diameter and a nozzle diameter of 0.05 inch, the free travel path for the ball is preferably in the range of 0.012 inch.

Although it is difficult to analyze fully the fluid flow around the ball 18, it is possible to generate an equation for the ball motion from an analysis of the forces acting on the ball provided certain simplifying assumptions are made. For example, when the device 14 shown in FIG. 6 is operated with a nearly incompressible fluid such as oil, the motion of the ball can be described by the expression $$m_b \ddot{x} + F_{f1} - F_{f2} = F_{m1} - F_{m2} \qquad (1)$$

where $m_b$ is the mass of the ball, $F_{f1}$ are the fluid flow forces tending to move the ball to the right (+x direction) $F_{f2}$ are the fluid flow forces tending to move the ball to the left (−x direction), $F_{m1}$ are the magnetic forces tending to move the ball to the right, and $F_{m2}$ are the magnetic forces tending to move the ball to the left. The magnetic forces $F_{m1}$ and $F_{m2}$ will of course depend on the coil current, the ball permeability and size, and the presence of ferromagnetic material other than the ball itself. A more useful expression for the flow forces can be derived from considering the fluid in the nozzles as enclosed in a control volume and applying the momentum equation to those volumes. Replacing the fluid force expressions in equation (1) with these derived expressions allows equation (1) to be written in the form $$m_b \ddot{x} - B_1 \dot{x} + B_2 \dot{x} + (P_{01} - P_{02})\left(\frac{\pi D_n^2}{4} - A_d + 2C_d A_d\right)$$
$$+ B_3 (P_{02} - P_{01}) = F_{m1} - F_{m2} \qquad (2)$$

where $B_1$, $B_2$, and $B_3$ are constants, $D_n$ is the diameter of the nozzles 24 and 26, $A_d$ is the cross-sectional area at the restrictions 64, and $C_d$ is the flow coefficient which is approximately 0.6 for a turbulent flow.

An analysis of the equation (2) shows that the oscillatory system is unstable, that is, the ball will move toward one nozzle or the other. This situation is characteristic of the invention where incompressible fluids are used and the supply pressure is applied through the inlets that communicate directly with the chamber 22. One advantage of such system is that less power is required to drive the ball 18 since the coils 40 need only pull the ball from the opposite nozzle a short distance before the fluid forces assist in driving the ball toward the other nozzle.

Figure 5:
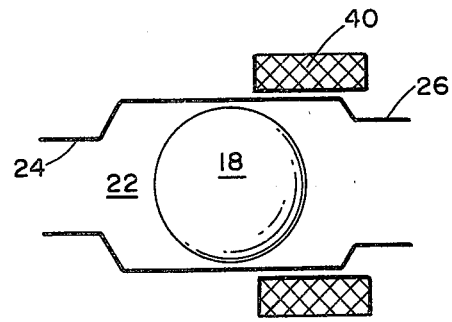
FIG. 5 is a simplified schematic view of an alternative embodiment of the invention which utilizes a single coil and nozzles having different diameters.

Although the invention has been described with reference to a pair of opposed nozzles each having the same diameter, it is also possible to achieve a suitable electrical to fluid conversion with the nozzles having different diameters, as shown in FIG. 5. The right-hand nozzle, as shown, is larger and applies greater fluid flow forces on the ball than the left-hand nozzle 24. If this force difference is uncompensated, the ball will remain at an equilibrium position near the nozzle 24. To establish an oscillation, a single control coil 40 is located near the larger nozzle. The magnetic forces generated by that coil is calculated to off-set the difference in the fluid flow forces generated by the nozzles so that appropriate variations in the current energizing the coil will effect the desired pulse width modulation.

There has been described an electro-fluid interface device that converts an electrical control signal into a proportional fluid flow or pressure while avoiding the high fabrication costs and problems of wear, contamination build up, friction and hysteresis associated with conventional torque motor devices and the like. The interface device of this invention can also be tuned electronically to a preselected frequency and amplitude and can operate at frequencies well in excess of the band pass of the fluid system, including hydraulic systems. The device is also highly flexible, in that it can operate with a wide variety of fluids ranging from incompressible, hydraulic fluids to compressible gases such as air or nitrogen. Further the interface device described above offers a fast response time and a good sensitivity to signals near the zero output level.

Although the control member 18 has been described hereinabove as a ball, it will be understood that it can assume a variety of shapes, provided that it can be oscillated in the desired manner by fluid and electromagnetic forces and can generate the desired control on the fluid flow through the nozzles 24 and 26. This and other modifications will become apparent to those skilled in the art from the foregoing description and the accompanying drawings. Such modifications are intended to fall within the scope of the appended claims.

What is claimed is:

1. An interface device for converting an electrical signal into a fluid flow proportional to the signal comprising, in combination, a housing having an internal chamber and associated fluid inlet, outlet and drain means, each in fluid communication with said chamber, that establish a fluid flow from said inlet means to said outlet and drain means, a control member movable in said chamber generally in a first direction, a pair of nozzles each having a first end in direct fluid communication with said chamber and aligned along said first direction on opposite sides of said control element to direct said fluid flow to oscillate said control element at a substantially steady frequency between said nozzles, means for electromagnetically pulse width modulating said oscillation in response to said electrical signal to establish a fluid flow through said outlet means that is proportional to said signal, and stops located in said chamber proximate each of said nozzles to prevent said control element from seating on the first ends of said nozzles.

2. An interface device according to claim 1 in which said control element is a ferromagnetic ball.

3. An interface device according to claim 1 in which said chamber has a generally cylindrical configuration and there is a clearance between said control element and said chamber.

4. An interface device according to claim 1 in which said modulating means comprises a pair of coils that each surround said chamber proximate one of said nozzles and are axially aligned along said first direction, and means for energizing said coils in response to said control signal.

5. An interface device according to claim 3 in which said nozzles have substantially the same dimensions and the spacing between said stops along said first direction is in the range of one fourth of the diameter of said nozzles at their first ends.

6. An interface device according to claim 1 in which said fluid inlet means communicate with said nozzles at the ends opposite said first ends, said drain means communicate with said chamber and said outlet means communicate directly with the interior of said nozzles.

7. An interface device for converting an electrical signal into a fluid flow proportional to the signal comprising, in combination, a housing having an internal chamber and associated fluid inlet, outlet and drain means, each in fluid communication with said chamber, that establish a fluid flow from said inlet means to said outlet and drain means, a control member movable in said chamber generally in a first direction, a pair of nozzles each having a first end in direct fluid communication with said chamber and aligned along said first direction on opposite sides of said control element to direct said fluid flow on said control element, means for sensing the position of said control element, means for electromagnetically driving said control element in oscillation between said nozzles in cooperation with said fluid flow and in response to said position sensing means and for pulse width modulating said oscillation in response to said electrical signal to establish a fluid flow through said outlet means that is proportional to said signal, and stops located in said chamber proximate each of said nozzles to prevent the control element from seating on the first ends of said nozzles.

8. An interface device according to claim 7 in which said control element is ferromagnetic and said sensing means comprises a feedback coil that surrounds said chamber to develop an induced voltage signal in response to changes in the location of said control element.

9. An interface device according to claim 7 in which said sensing means comprises a light emitting diode and photodiode pair associated with each of said nozzles, and arranged so that when the control element is near one of the nozzles it interrupts the light from the associated light emitting diode falling on the paired photodiode and thereby changes its state.

10. An interface device according to claim 9 in which said driving and modulation means comprises a pair of coils that each surround said chamber proximate one of said nozzles and are axially aligned along said first direction and means for energizing said coils in a generally alternating fashion in response to the state of said photodiodes.

11. An interface device according to claim 7 in which said chamber has a generally cylindrical configuration and there is a clearance between said control element and said chamber.

12. An interface device according to claim 7 in which said nozzles have substantially the same dimensions and the spacing between said stops along said first direction is in the range of one-fourth of the diameter of said nozzles at their first ends.

13. An interface device according to claim 7 in which said fluid inlets communicate with said nozzles at the ends opposite said first ends, said drain means communicate with said chamber and said outlet means communicate directly with the interior of said nozzles.

14. An interface device according to claim 7 in which said fluid inlet means communicate directly with said chamber and are located on opposite sides of said control element, said drain means communicate with said nozzles at the ends opposite said first ends, and said outlet means communicate directly with the interior of said nozzles.

15. An interface device according to claim 7 further comprising light readout means responsive to said sensing means to provide a visual indication of the operating condition of said device.

* * * * *